(12) United States Patent
Norem et al.

(10) Patent No.: US 9,163,767 B2
(45) Date of Patent: Oct. 20, 2015

(54) OVERSHAFT FLUID TRANSFER COUPLING AND MOUNTING ARRANGEMENT

(75) Inventors: Dean A. Norem, Cherry Valley, IL (US); Timothy P. Walgren, Byron, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 793 days.

(21) Appl. No.: 13/350,893

(22) Filed: Jan. 16, 2012

(65) Prior Publication Data

US 2013/0184113 A1    Jul. 18, 2013

(51) Int. Cl.
*F16L 39/04*    (2006.01)

(52) U.S. Cl.
CPC ............... *F16L 39/04* (2013.01); *Y10T 29/494* (2015.01)

(58) Field of Classification Search
CPC ......... F16J 15/44; F16J 15/441; F16J 15/443; F16L 39/04; Y10T 29/494
USPC ......... 277/422, 429–432, 579, 585; 186/6.12; 184/6.11, 61.12; 251/304
See application file for complete search history.

(56) References Cited

U.S. PATENT DOCUMENTS

| | | | |
|---|---|---|---|
| 2,805,742 A * | 9/1957 | Alexandrescu | 192/3.26 |
| 4,251,186 A | 2/1981 | Chomel et al. | |
| 4,632,403 A | 12/1986 | Ishitani et al. | |
| 5,119,905 A | 6/1992 | Murray | |
| 5,246,087 A | 9/1993 | Schipper | |
| 6,098,753 A | 8/2000 | Lamarre et al. | |
| 6,845,987 B2 | 1/2005 | McCutchan | |
| 7,159,873 B2 | 1/2007 | McChutchan | |
| 7,225,897 B2 | 6/2007 | Hori et al. | |
| 7,249,768 B2 | 7/2007 | Keba | |
| 8,047,548 B2 | 11/2011 | Roddis | |

FOREIGN PATENT DOCUMENTS

FR    1499978    * 11/1967

* cited by examiner

*Primary Examiner* — Marina Tietjen
(74) *Attorney, Agent, or Firm* — Carlson, Gaskey & Olds, P.C.

(57) ABSTRACT

In one example embodiment, a fluid transfer coupling arrangement includes a hollow shaft that is arranged in a housing and rotatable about an axis. The hollow shaft is provided by a wall having radially spaced interior and exterior surfaces. A first passage extends through the wall and is configured to communicate fluid between the interior and exterior surfaces. A fluid coupling is located mid-shaft, sealed about the exterior surface, and aligns to the first passage. The fluid coupling provides a second passage that is in fluid communication with the first passage. The fluid coupling includes a locating feature configured to permit radial movement of the fluid coupling relative to the housing and allowing the fluid coupling to track subtle shaft movements.

12 Claims, 5 Drawing Sheets

OVERSHAFT FLUID TRANSFER COUPLING AND MOUNTING ARRANGEMENT

BACKGROUND

This disclosure relates to an overshaft fluid transfer coupling and mounting arrangement for same.

Some machines include rotating hollow shafts through which fluid is transferred within the interior of the shaft. Often the fluid may be communicated from one end of the shaft to the other end of the shaft. However, some applications, which include spatial constraints at the shaft ends, may require fluid transfer through the radial wall of the shaft. A fluid coupling is arranged over the shaft and concentric annuli between close tolerance lands provide a transfer path between the fluid coupling and the rotating shaft. A bolted flange joint typically fastens the fluid coupling to the machine's housing.

SUMMARY

In one example embodiment, a fluid transfer coupling arrangement includes a hollow shaft that is arranged in a housing and rotatable about an axis. The hollow shaft is provided by a wall having radially spaced interior and exterior surfaces. A first passage extends through the shaft wall and is configured to communicate fluid between the interior and exterior surfaces. A fluid coupling is positioned about the exterior surface and straddles the first passage. The fluid coupling creates a second passage that is in alignment with the first passage and provides fluid communication. The fluid coupling includes a locating feature configured to permit compliance and radial movement of the fluid coupling relative to the housing.

In one example, the fluid transfer coupling has a sleeve with an interior surface providing sealing surfaces axially spaced from one another. The first and second sealing surfaces bound a portion of the second passages created between sleeve and shaft. A port is in fluid communication with the second passage portion. The locating feature configured to permit the sleeve to float is provided by a retaining ring on shaft exterior and a tab extending into the housing 40 from the exterior surface of the sleeve.

An example method of assembly of the fluid transfer coupling arrangement includes installing a sleeve about the exterior surface of the hollow shaft to provide a shaft assembly. The shaft assembly is inserted into the housing. The locating feature of the sleeve is positioned relative to a corresponding locating feature on the housing. The sleeve is permitted to float radially relative to the housing.

BRIEF DESCRIPTION OF THE DRAWINGS

The disclosure can be further understood by reference to the following detailed description when considered in connection with the accompanying drawings.

DETAILED DESCRIPTION

Figure 1:
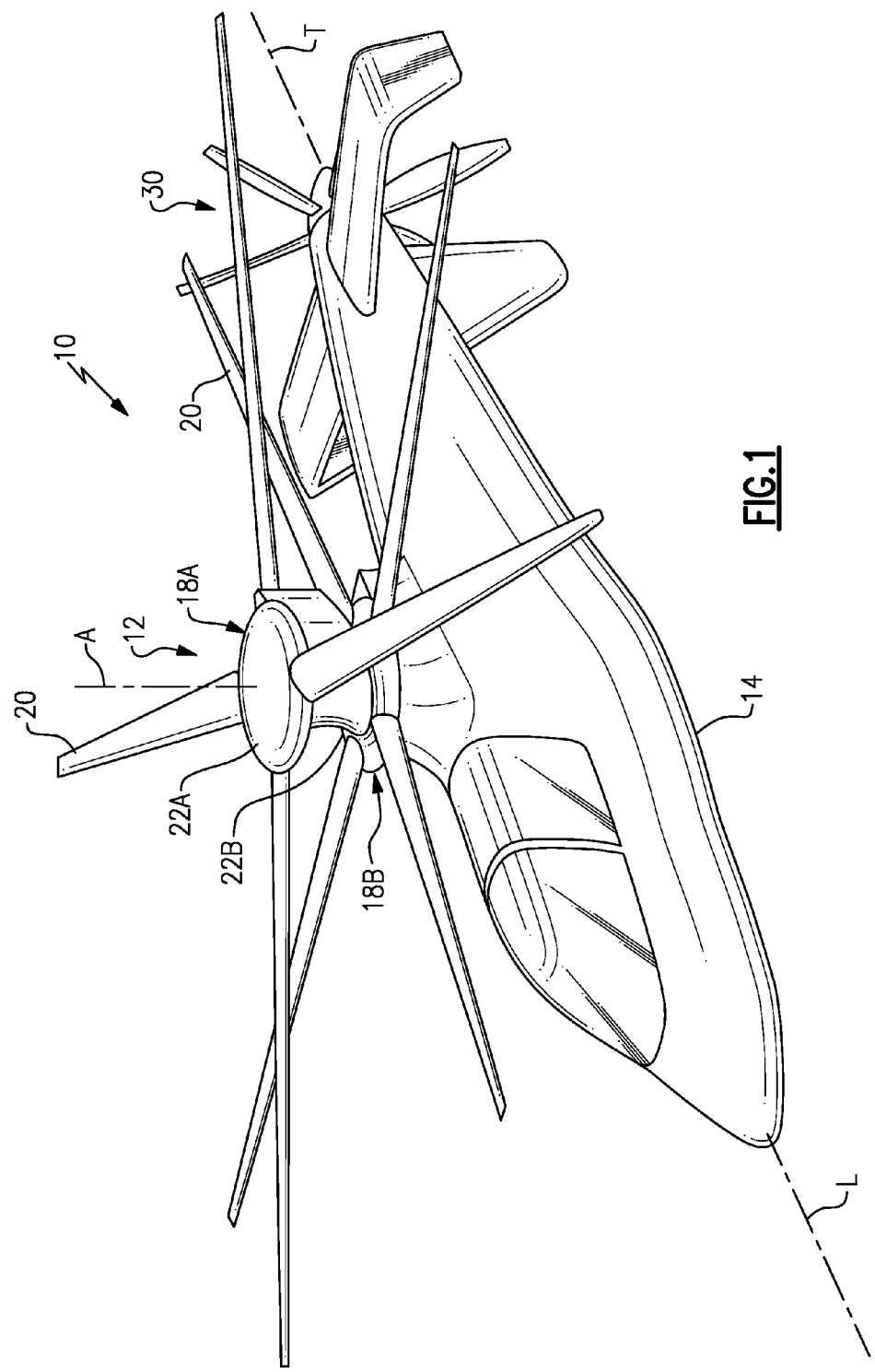
FIG. 1 is a general schematic view of an exemplary rotary wing aircraft embodiment for use with the present disclosure.

FIG. 1 schematically illustrates an exemplary high speed vertical takeoff and landing (VTOL) rotary-wing aircraft 10 having a counter-rotating, coaxial rotor system 12 which rotates about an axis of rotation A. The aircraft 10 includes an airframe 14 that supports a drive system 16 (FIG. 2), which generally includes the rotor system 12, a powertrain system 24, a power plant system 26, and a secondary thrust system 30. The secondary thrust system 30 provides secondary thrust generally parallel to an aircraft longitudinal axis L while the main rotor system 12 operates in an unloaded reverse flow state during a high-speed forward flight profile. Although a particular aircraft configuration is illustrated and described in the disclosed embodiment, other configurations and/or machines, such as high speed compound rotary-wing aircraft with supplemental secondary thrust systems, dual contra-rotating, coaxial rotor system aircraft, turbo-props, tilt-rotor, tilt-wing aircraft and non-aircraft applications will also benefit from the disclosed planetary gear system.

The main rotor system 12 includes an upper rotor system 18A and a lower rotor system 18B. Each rotor system 18A, 18B includes multiple rotor blades 20 mounted to a respective rotor hub 22A, 22B for rotation about a rotor axis of rotation A. Any number of blades 20 may be used with the rotor system 12.

Figure 2:
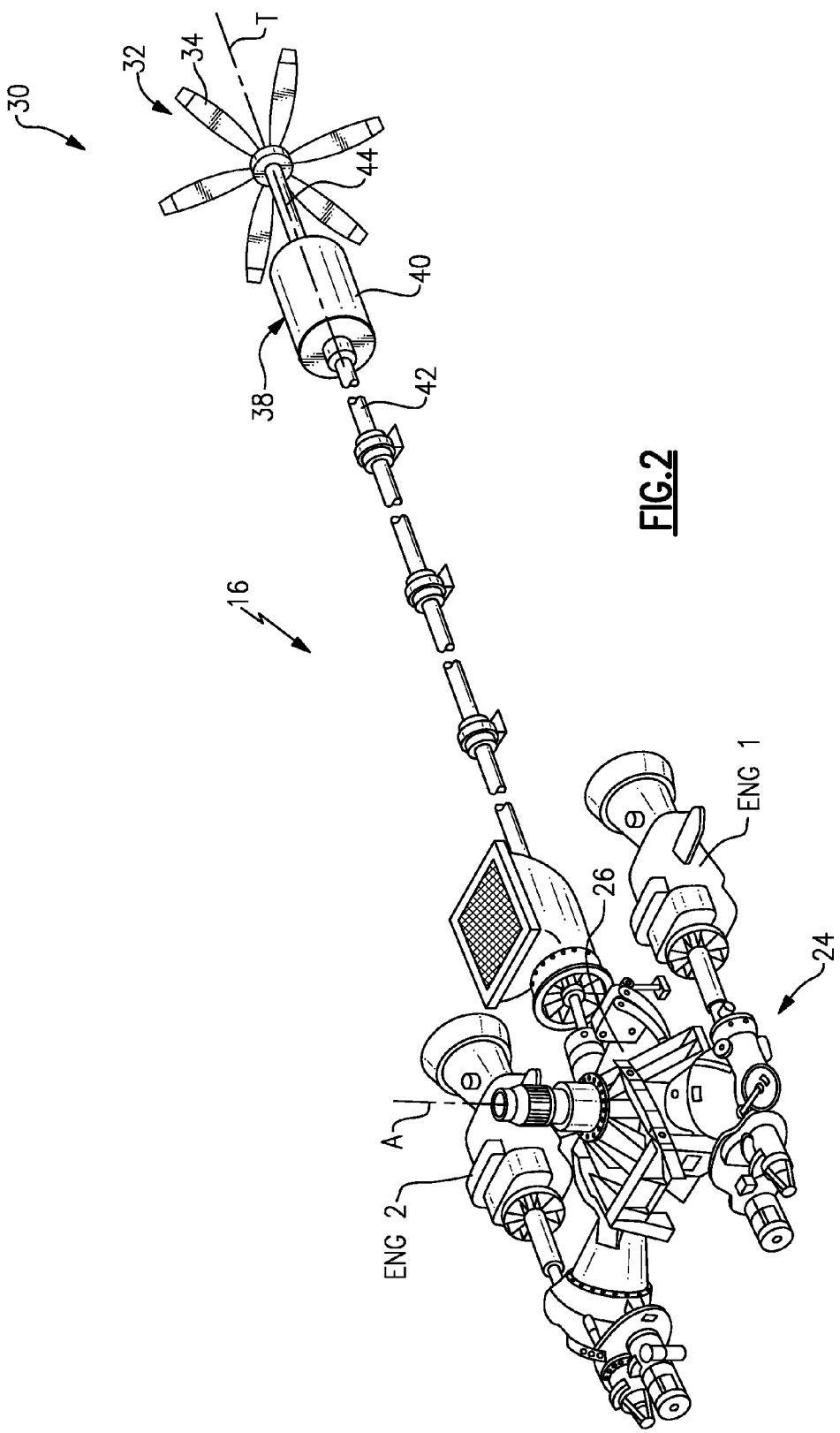
FIG. 2 is a general schematic view of a drive system for the rotary wing aircraft.

With reference to FIG. 2, the powertrain system 24 interconnects the power plant system 26, the rotor system 12 and the secondary thrust system 30. The powertrain system 24 may include various gear systems such as main and combiner gearboxes. The power plant system 26 generates the power available for flight operations to power the main rotor system 12 and the secondary thrust system 30 through the powertrain system 24. The power plant system 26 in the disclosed, non-limiting embodiment includes two engine packages ENG1, ENG2, however, single engine systems as well as multi-engine systems will also benefit from the disclosed planetary gear system.

The secondary thrust system 30 in one non-limiting embodiment may be mounted to the rear of the airframe 14 transverse to the axis of rotation A with a rotational axis T thereof oriented substantially horizontal and parallel to an aircraft longitudinal axis L to provide thrust for high-speed flight. It should be understood that other configurations of the secondary thrust system 30 such as a propeller system mounted to each side of the airframe, a lift fan system, or other system alternatively may be utilized. In this disclosed, non-limiting embodiment, the secondary thrust system 30 includes a pusher propeller system 32 including pusher blades 34. Power is transmitted from an input shaft 42 of the drive system 16 through a gearbox 38 to an output shaft 44 to rotationally drive the pusher propeller system 32.

Figure 3:
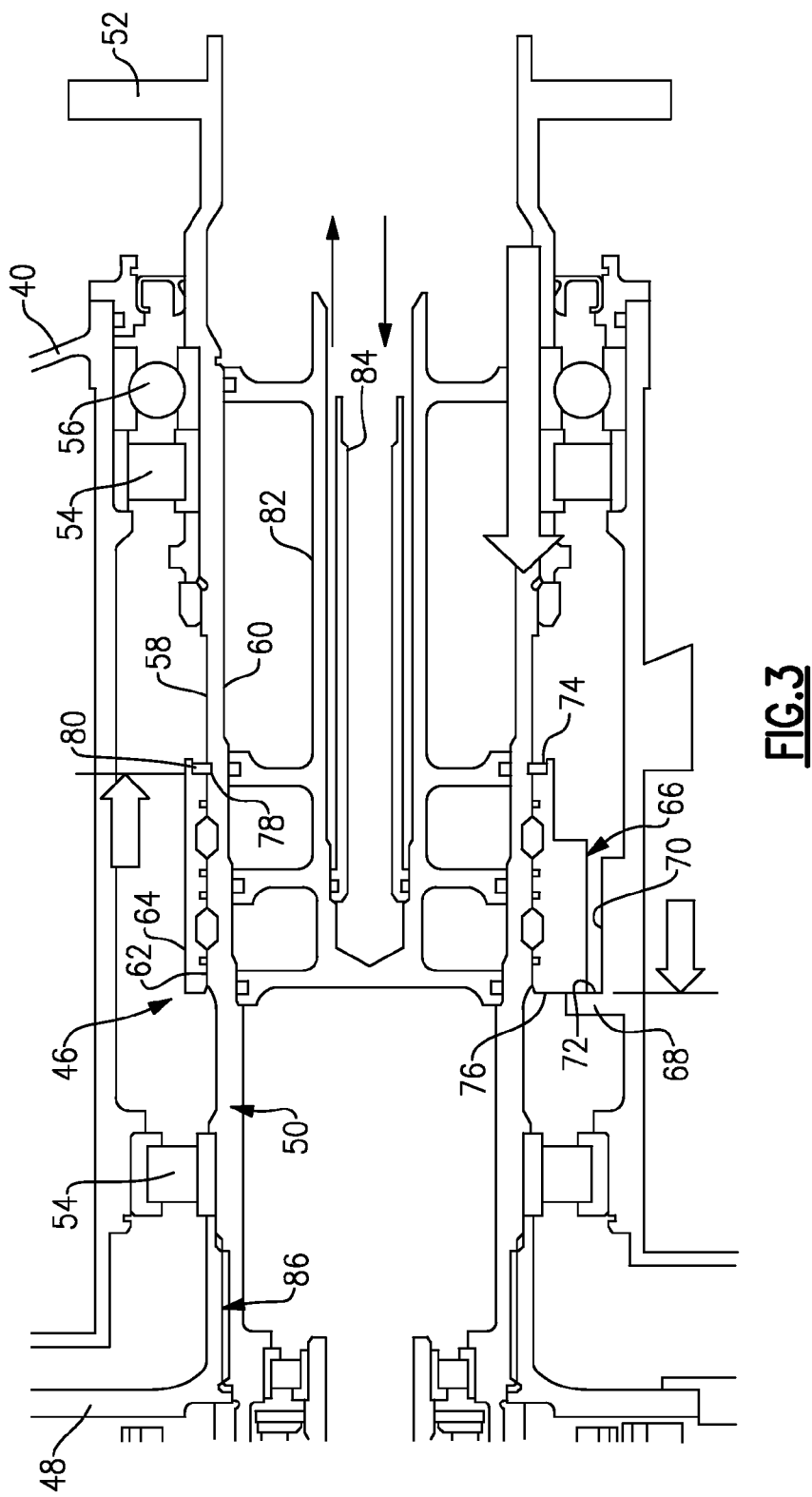
FIG. 3 is a cross-sectional view of a shaft assembly relating to an assembly procedure.
Figure 4:
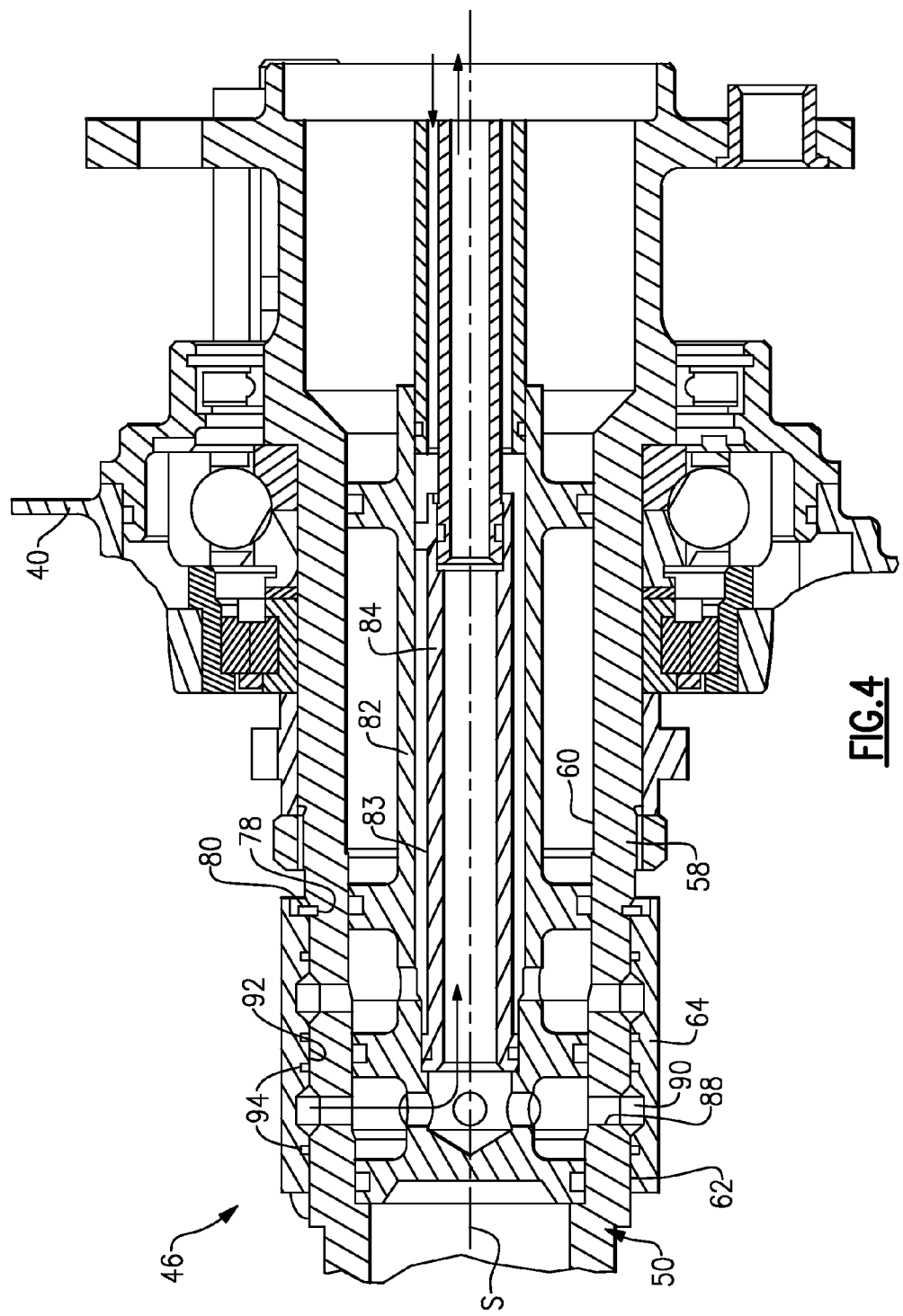
FIG. 4 is a cross-sectional view of the shaft assembly of FIG. 3 illustrated in more detail.

In one example embodiment shown in FIGS. 3 and 4, a fluid transfer coupling sleeve 46 is used within the gearbox 38. The fluid transfer coupling 46 includes a hollow shaft 50 that is arranged in the housing 40 and rotatable about an axis S. In one example, an input member 48, which is operatively coupled to the input shaft 42, is connected to the hollow shaft 50 by a splined connection 86. The hollow shaft 50 is supported for rotation relative to the housing 40 by roller bearings 54 and a thrust bearing 56 in the example. An output member 52 is provided at one end of the hollow shaft 50, for example, and is operatively coupled to the output shaft 44.

The hollow shaft 50 has a wall 58 with radially spaced interior and exterior surfaces 60, 62. A first passage 88 extends through the wall 58 and is configured to communicate fluid between the interior and exterior surfaces 60, 62. A sleeve 64 provides the fluid coupling onto the hollow shaft 50. Leakage is controlled by the use of close-tolerance lands at localized portions of the exterior surface 62 and the interior surfaces of the sleeve 64. Annular voids created between the close tolerance seal lands provides a second passage 90, which is annular, that aligns with first passage 88 to transfer fluid (fluid flow shown by small arrows) between an externally mounted controller device 110 and the interior of the hollow rotating shaft 50.

As can be appreciated from the figures, more than one passage may be provided through the hollow shaft 50. For example, first and second members 82, 84 may be nested within the interior of the hollow shaft 50 and provide an annular passage 83 that communicates another fluid flow within the hollow shaft 50. In the example, the fluid actuates a two-way hydraulic cylinder (not shown) mounted on the output shaft 52.

In the example, the sleeve 64 is arranged axially at midspan between the roller bearings 54. Manufacturing runouts, bearing clearances and induced bending moments on the shaft flange 52 may result in the hollow shaft 50 having some undesired radial movements in the area of the coupling sleeve 64. To this end, the fluid coupling 46 includes one or more locating features that maintain the sleeve 64 in desired circumferential, axial and radial positions while permitting some radial movement of the sleeve 64 to maintain a uniform gap and desired sealing engagement with the hollow shaft 50.

The sleeve 64 includes a locating feature, provided by a tab 66 in one example, configured to permit nominal radial movement of the sleeve 64 relative to the housing 40. The tab 66, which acts as a key in the example, is received in a slot 70 provided by a boss 68 in the housing 40. A nominally suitable tangential clearance is preserved in that key and slot arrangement. A radial clearance 112 is provided between the housing 40 and tab 66 to permit the sleeve 64 to float, best shown in FIG. 5B. The tab 66 extends an axial length T and includes a circumferential width W, best shown in FIG. 5A. The clearances aid in assembly and allow compliance of the sleeve unit during operation.

Returning to FIG. 3, the sleeve 64 includes a first side 74. The hollow shaft 50 has a groove 78 that receives a retaining ring 80, which provides an axial stop on the shaft body. In the example, the tab 66 is flush with a second side 76 of the sleeve 64. The boss 68 provides an axial stop 72 for the sleeve 64. Thus, the boss 68 and the retaining ring 80 axially locate the sleeve 64 within an allowable set of operating clearances.

Referring to FIG. 4, in one example, the sleeve 64 has an interior surface 92 providing first and second sealing surfaces. These surfaces can include features that improve sealing capability, such as grooves 94, axially spaced from the edges and one another. The seal lands bound the annular passage 90. The sleeve 64 includes a boss 98 that receives a transfer tube 102, for example, which provides a port 100 (two shown). The port 100 supplies fluid communication with the annulus passage 90. The housing 40 includes a clearance hole 104 (two exist, one is shown), best shown in FIGS. 5A and 5B. A transfer tube 102 extends through each hole 104 and is removably received in the port 100. A controller 110 is secured to the housing 40 over the tubes 102 and selectively regulates fluid flow and pressure into the fluid coupling 46. Three seals 106, 108, and 114 respectively seal between the transfer tube 102, the sleeve 64, housing 40, and controller 110. In this manner, and with its extended length and tangential entry into sleeve, the transfer tube 102 further accommodates some radial movement of the sleeve 64 during operation.

Figure 5B:
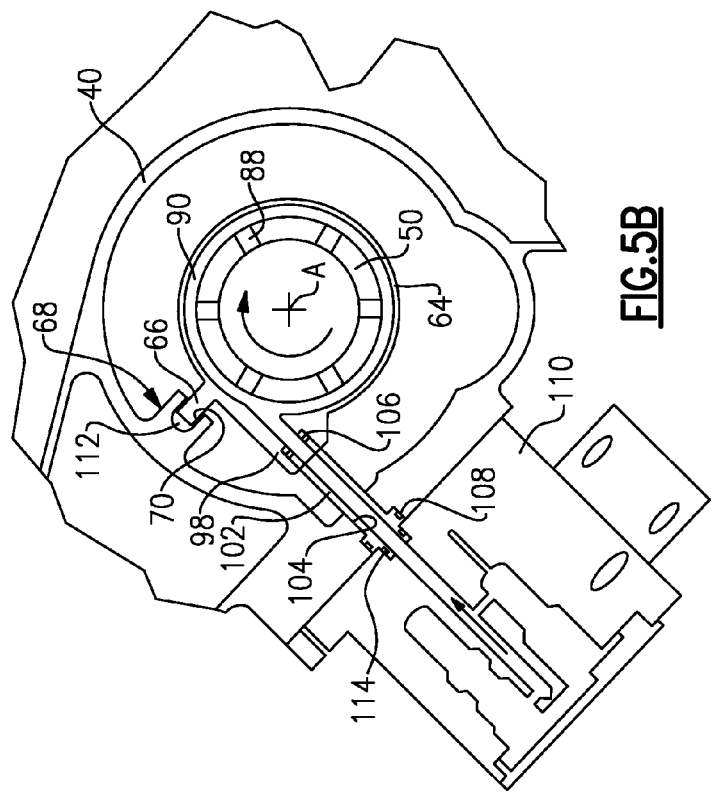
FIG. 5B is a cross-sectional true view of the fluid transfer coupling shown in FIG. 5A in the housing.
Figure 5A:
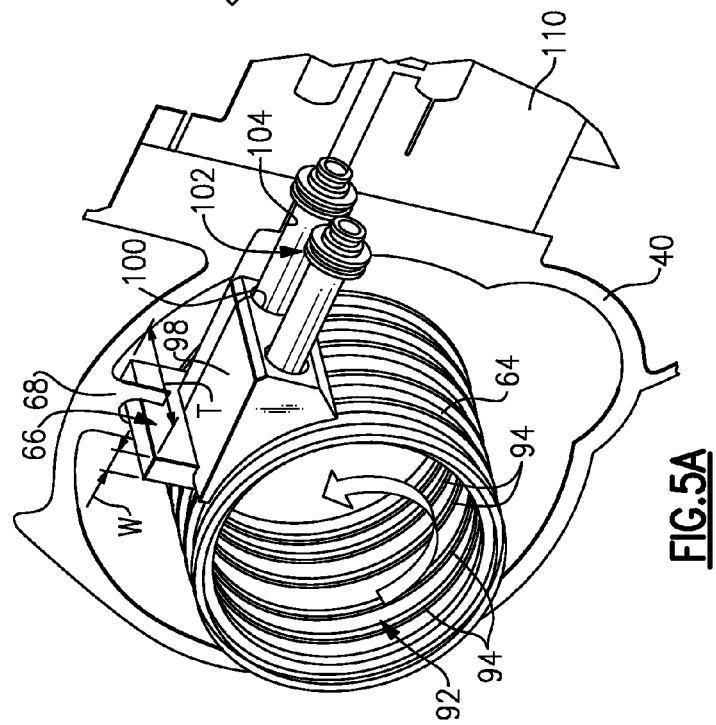
FIG. 5A is a perspective view of a fluid transfer coupling depicted schematically within a housing profile.

An example method of assembly of the fluid transfer coupling 46 is schematically shown in FIG. 3 by the large block arrows. The assembly method includes installing the sleeve 64 about the exterior surface 62 of the hollow shaft 50 to provide a shaft assembly. In the example, the sleeve 64 slid over the hollow shaft 50 until the first side 74 abuts the retaining ring 80. The shaft assembly is inserted into the housing 40 until the thrust bearing 56 bottoms on housing 40. The tab 66 is positioned relative to the corresponding slot 70, where the second side 76 maintains a nominal axial clearance to the stop 72. The sleeve 64 is permitted to float radially relative to the housing 40 due to the radial clearance 112 (FIG. 5B). The transfer tubes 102 are inserted through the holes 104 and into the ports 100. The actuator 110 is secured to the housing 40 to capture the tubes 102. In this manner, the short, direct control loop is provided between the actuator and the hollow shaft 50 and components fluidly connected to the hollow shaft 50.

Although an example embodiment has been disclosed, a worker of ordinary skill in this art would recognize that certain modifications would come within the scope of the claims. For that reason, the following claims should be studied to determine their true scope and content.

What is claimed is:

1. A fluid transfer coupling arrangement comprising:
   a housing;
   a hollow shaft arranged in the housing and rotatable about an axis, the hollow shaft provided by a wall having radially spaced interior and exterior surfaces, and a first passage extending through the wall and configured to communicate fluid between the interior and exterior surfaces;
   a fluid coupling sealed about the exterior surface and the first passage, the fluid coupling providing a second passage in fluid communication with the first passage, the fluid coupling including a locating feature configured to permit radial movement of the fluid coupling relative to the housing.

2. The arrangement according to claim 1, comprising first and second bearings supporting the hollow shaft relative to the housing, the fluid coupling arranged axially between the first and second bearings.

3. The arrangement according to claim 1, comprising first and second seals axially spaced from one another and arranged radially between the fluid coupling and the hollow shaft, the second passage axially between the first and second seals.

4. The arrangement according to claim 1, comprising a member arranged within the hollow shaft and providing an axially extending annular passage, the first passage fluidly connecting the second passage to the annular passage.

5. A fluid transfer coupling arrangement comprising:
   a housing, wherein the housing includes a boss with a slot;
   a hollow shaft arranged in the housing and rotatable about an axis, the hollow shaft provided by a wall having radially spaced interior and exterior surfaces, and a first passage extending through the wall and configured to communicate fluid between the interior and exterior surfaces; and
   a fluid coupling sealed about the exterior surface and the first passage, the fluid coupling providing a second passage in fluid communication with the first passage, the fluid coupling including a locating feature configured to permit radial movement of the fluid coupling relative to the housing, and the fluid coupling includes a key that is slidably received in the slot, a radial clearance is provided between the boss and the key.

6. The arrangement according to claim 5, wherein the key extends an axial length and includes a circumferential width less than the axial length.

7. The arrangement according to claim 5, wherein the boss provides a first axial stop for the fluid coupling.

8. The arrangement according to claim 7, comprising a retaining ring secured to one of the hollow shaft and the fluid coupling, the retaining ring providing a second axial stop for the fluid coupling.

9. A fluid transfer coupling arrangement comprising:
a housing, wherein the housing includes a hole;
a hollow shaft arranged in the housing and rotatable about an axis, the hollow shaft provided by a wall having radially spaced interior and exterior surfaces, and a first passage extending through the wall and configured to communicate fluid between the interior and exterior surfaces;
a fluid coupling sealed about the exterior surface and the first passage, the fluid coupling providing a second passage in fluid communication with the first passage, the fluid coupling including a locating feature configured to permit radial movement of the fluid coupling relative to the housing, and the fluid coupling includes a port in fluid communication with the second passage; and
a transfer tube extending through the hole and removably received in the port, the transfer tube providing the locating feature.

10. The arrangement according to claim 9, comprising an actuator secured to the housing for selectively regulating fluid flow through the fluid coupling, the transfer tube fluidly connecting the actuator to the fluid coupling.

11. A fluid transfer coupling comprising:
a sleeve having an interior surface providing first and second sealing surfaces axially spaced from one another, the first and second sealing surfaces bounding a portion of a fluid passage, a port in fluid communication with the fluid passage portion, and a locating feature provided by at least one of the port and a tab extending from an exterior surface of the sleeve configured to permit the sleeve to float; and
a transfer tube having an end removably received in the port.

12. The coupling according to claim 11, wherein the tab provides a key extending an axial length and a circumferential width less than the axial length.

* * * * *